United States Patent
Asai

(10) Patent No.: US 6,705,770 B2
(45) Date of Patent: Mar. 16, 2004

(54) METHOD OF MANUFACTURING A RECEPTACLED OPTO-ELECTRONIC MODULE

(75) Inventor: Masao Asai, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 177 days.

(21) Appl. No.: 10/058,332

(22) Filed: Jan. 30, 2002

(65) Prior Publication Data

US 2003/0142927 A1 Jul. 31, 2003

(51) Int. Cl.[7] .............................. G02B 6/00; G02B 6/36
(52) U.S. Cl. .......................................... 385/92; 385/147
(58) Field of Search .............................. 385/88–93, 147

(56) References Cited

U.S. PATENT DOCUMENTS 3,663,194 A * 5/1972 Greenstein et al. ............ 65/43
2002/0110336 A1 * 8/2002 Dair et al. ..................... 385/92
2003/0026081 A1 * 2/2003 Liu et al. ..................... 361/760
2003/0026556 A1 * 2/2003 Mazotti et al. ................ 385/92
2003/0099444 A1 * 5/2003 Kim et al. ..................... 385/88

FOREIGN PATENT DOCUMENTS

| JP | 07168065 A | 7/1995 |
| JP | 07253525 A | 10/1995 |

* cited by examiner

Primary Examiner—Akm Enayet Ullah
(74) Attorney, Agent, or Firm—Volentine Francos, PLLC

(57) ABSTRACT

In an opto-electronic module including an opto-electronic unit and a receptacle, the receptacle has an outer indentation. When the module is assembled, the receptacle is held in a fixture with a projecting lip that fits into the indentation. After optical alignment, the receptacle is fastened to the opto-electronic unit by welding. The projecting lip prevents the receptacle from moving during the welding process, thereby assuring that optical alignment is maintained.

8 Claims, 11 Drawing Sheets

FIG.4 PRIOR ART
FIG.2 PRIOR ART
FIG.3 PRIOR ART
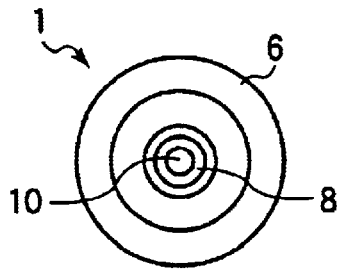
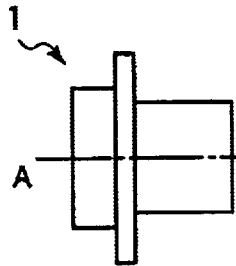
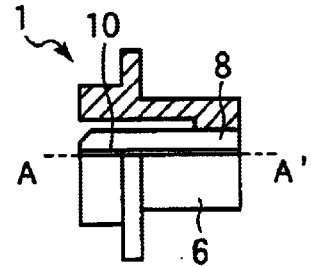
FIG.6 PRIOR ART
FIG.5 PRIOR ART
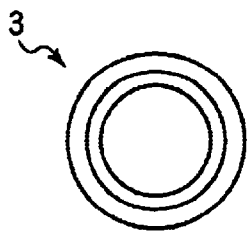
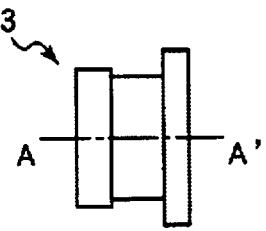
FIG.8 PRIOR ART
FIG.7 PRIOR ART
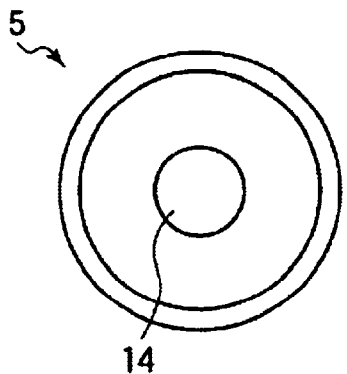
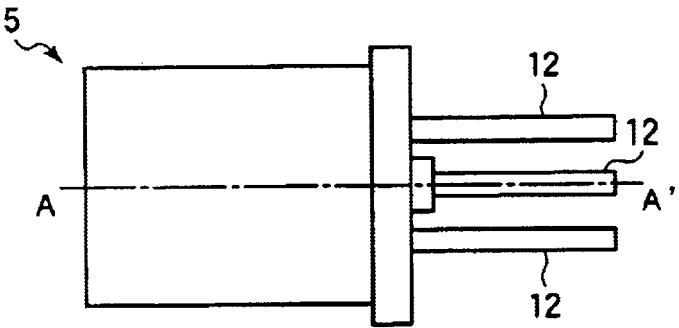

METHOD OF MANUFACTURING A RECEPTACLED OPTO-ELECTRONIC MODULE

BACKGROUND OF THE INVENTION

1. Field of the Invention

The present invention relates to a method of manufacturing an opto-electronic module of the receptacled type often used in optical transmission systems. More specifically, the invention relates to the receptacle structure of the module, and to a fixture for immobilizing the receptacle during the assembly process.

2. Description of the Related Art

One common type of receptacled opto-electronic module is a coaxial laser diode module including a laser diode unit, a receptacle, and a sleeve. In the assembly process, the receptacle and the laser diode unit are held in respective fixtures, the sleeve is mounted on the receptacle, and the laser diode unit is optically aligned with the receptacle and sleeve. The alignment is performed by supplying power to the laser diode unit and measuring the optical output obtained through an optical fiber coupled to the receptacle. When satisfactory optical output is obtained, the sleeve is spot-welded to the receptacle and laser diode unit, securing these three parts in the correctly aligned positions.

A problem is that the welding process can disturb the optical alignment. In the inventor's experience, in about twenty to thirty percent of the coaxial laser diode modules assembled in the above way, the optical output obtained after the welding step is at least two decibels (2 dB) less than the optical output obtained in the alignment step. In extreme cases, the optical output falls below the specification value, causing the module to be rejected. Even in less extreme cases, the output characteristics may be degraded to the point that the module fails a reliability test and is rejected for that reason. As a result, the yield of the manufacturing process is lowered, and the manufacturing cost per module is increased.

SUMMARY OF THE INVENTION

An object of the present invention is to prevent the welding step in the assembly of a receptacled opto-electronic module from disturbing the optical alignment of the receptacle and the opto-electronic unit.

The invention provides a method of manufacturing an opto-electronic module having an opto-electronic unit for generating a light beam and a receptacle for attachment of a cable into which the light beam is optically coupled. In the invented method, an indentation is formed in the receptacle, and the receptacle is held in a first fixture having a projecting lip that fits into the indentation. The opto-electronic unit is held in a second fixture and is optically aligned with the receptacle. The receptacle and opto-electronic unit are then fastened together by welding.

During the welding process, the projecting lip of the first fixture keeps the receptacle from moving toward the opto-electronic unit, so that the receptacle is held immobilized and the optical alignment is preserved.

The opto-electronic module manufactured by the method of the invention includes an opto-electronic unit for generating a light beam and a receptacle for attachment of an optical fiber cable into which the light beam is optically coupled. The receptacle is secured to the opto-electronic unit by welding, and has an indentation enabling the receptacle to be held in the first fixture to immobilize the receptacle during the welding process.

The receptacle may have a generally cylindrical shape with a first end and a second end, the first end being attached to the opto-electronic unit. The indentation may be formed by a reverse taper of the second end, or by a rectangular groove running around the second end. The opto-electronic module may also include a sleeve, the receptacle being welded to the sleeve and the sleeve being welded to the opto-electronic unit.

The opto-electronic module may be a coaxial laser diode module.

The first fixture used in the manufacturing method of the invention holds the receptacle of the opto-electronic module, first while the receptacle is being optically aligned with an opto-electronic unit of the opto-electronic module, then while the receptacle is being fastened to the opto-electronic unit by welding. The first fixture has a projecting lip fitting into an indentation in the receptacle to immobilize the receptacle during said welding.

The first fixture may include a flat part and a V-shaped part, the receptacle being held between the flat part and the V-shaped part. The projecting lip may be present in both the flat part and the V-shaped part, and may have a trapezoidal or a rectangular sectional shape.

BRIEF DESCRIPTION OF THE DRAWINGS

In the attached drawings:

FIG. 2 is a side view of the receptacle in FIG. 1;

FIG. 3 is a partially cutaway side view of the receptacle in FIG. 1;

FIG. 4 is an end view of the receptacle in FIG. 1;

FIG. 5 is a side view of the sleeve in FIG. 1;

FIG. 6 is an end view of the sleeve in FIG. 1;

FIG. 7 is a side view of the laser diode unit in FIG. 1;

FIG. 8 is an end view of the laser diode unit in FIG. 1;

DETAILED DESCRIPTION OF THE INVENTION

Figure 1:
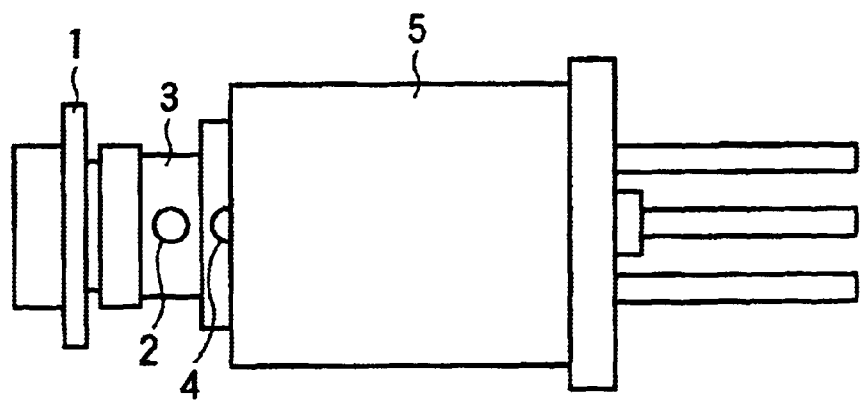
FIG. 1 is a side view of a conventional coaxial laser diode module.

Embodiments of the invention will be described with reference to the attached drawings, in which like parts are indicated by like reference characters. The opto-electronic modules in the embodiments are coaxial laser diode modules, each comprising a laser diode unit, a receptacle, and a sleeve. The description of the embodiments will be preceded by a more detailed description of the structure and assembly of a conventional coaxial laser diode module, on which the embodiments are based.

FIG. 1 shows the conventional coaxial laser diode module in the finished state. The receptacle 1 is attached by a spot weld 2 to the sleeve 3, which is attached by a spot weld 4 to the laser diode unit 5.

FIG. 2 shows a side view of the receptacle 1, line A–A' indicating the optical axis. FIG. 3 is a side view partially cut away in a plane through line A–A', showing that the receptacle 1 comprises a flange 6 encasing a ferrule 8, which holds a length of optical fiber 10. The ferrule 8 is attached to the lower end of the flange 6 (the right end in FIG. 3). The concentric positional relationships of the flange 6, ferrule 8, and optical fiber 10 can be better seen in the end view in FIG. 4.

FIG. 5 shows a side view and FIG. 6 shows an end view of the sleeve 3, which fits over the flange 6 of the receptacle 1.

FIG. 7 shows a side view and FIG. 8 shows an end view of the laser diode unit 5. Two of the terminals 12 shown in FIG. 7 supply electrical power to a laser diode 14 in the laser diode unit 5. The laser diode 14 is visible in FIG. 8.

Figure 9:
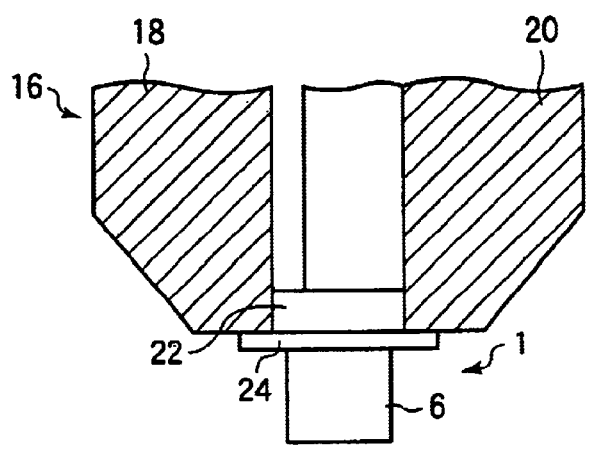
FIG. 9 is a partially cutaway side view showing the receptacle in FIG. 1 held in a conventional fixture.
Figure 10:
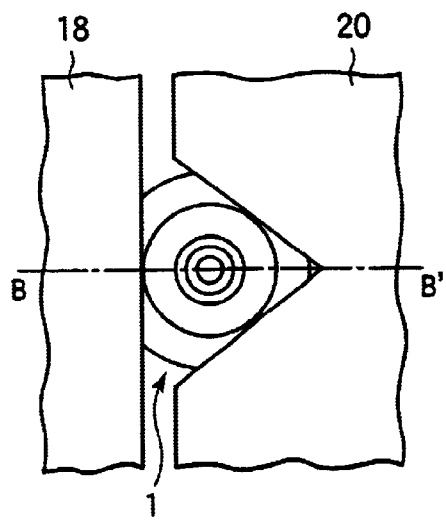
FIG. 10 is a top view of the receptacle and fixture shown in FIG. 9.

When the conventional coaxial laser diode module is assembled, the receptacle 1 is held upright in a two-part fixture 16 as shown in FIG. 9. The two parts 18, 20 of the fixture 16 grip the upper end 22 of the flange 6 and rest against a projecting ring 24 of the flange 6. As shown in FIG. 10, one part 18 of the fixture 16 is flat while the other part 20 is V-shaped, so the receptacle 1 is held at three points.

Figure 11:
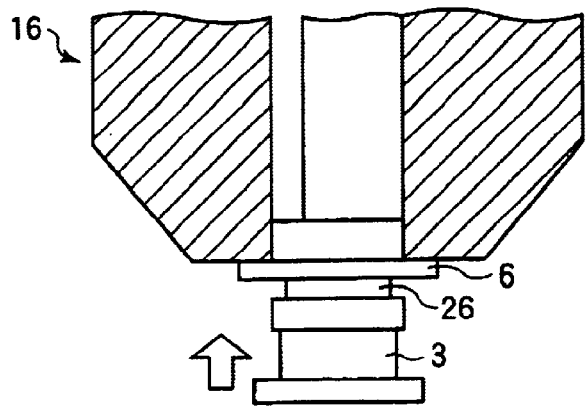
FIG. 11 is a partially cutaway side view showing the sleeve in FIG. 5 being mounted on the receptacle in FIG. 9.
Figure 12:
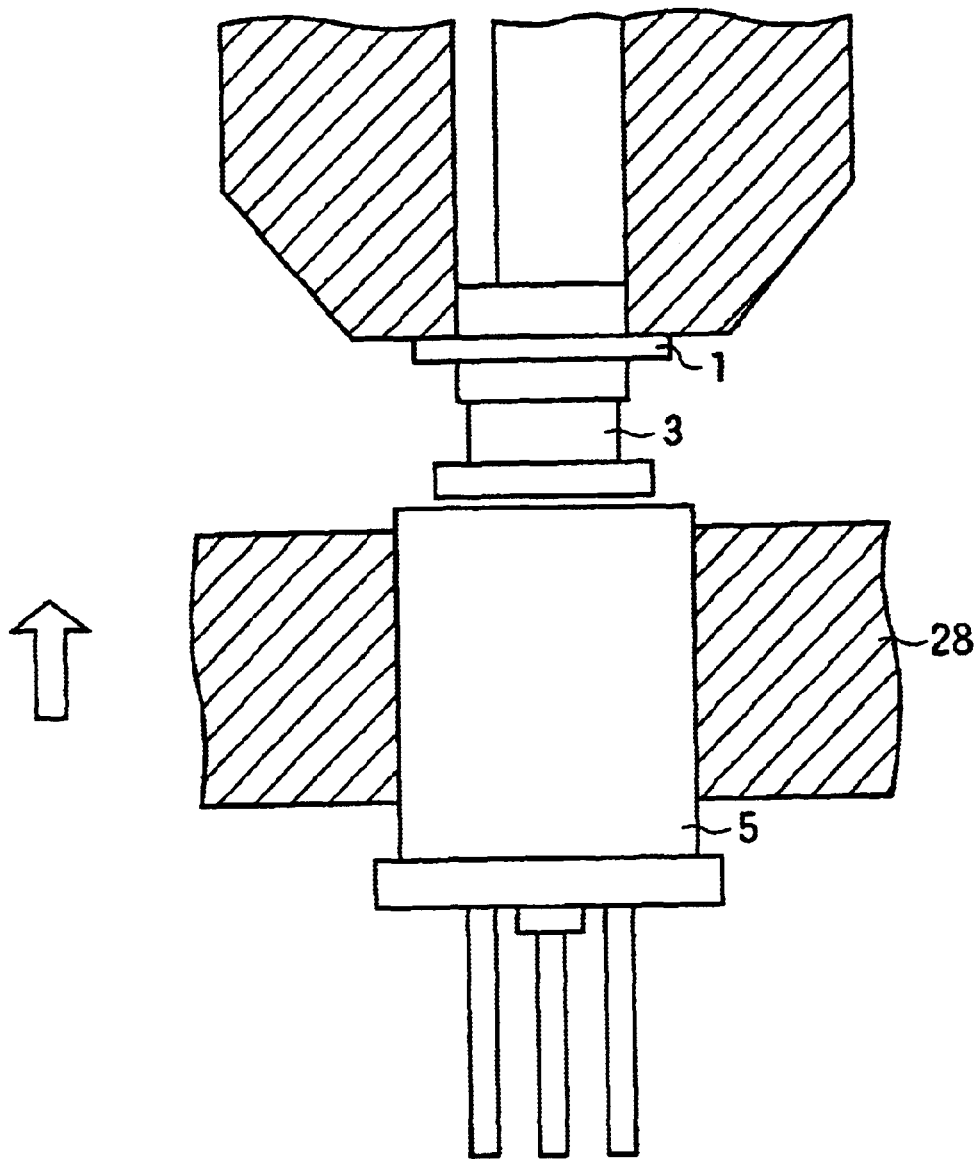
FIG. 12 is a partially cutaway side view showing the laser diode unit in FIG. 7 being moved into position just below the receptacle and sleeve in FIG. 11.

In the next step in the assembly process, the sleeve 3 is mounted on the receptacle by being slid over the lower end 26 of the flange 6, as indicated by the arrow in FIG. 11. The laser diode unit 5, which is held in another fixture 28, is now brought into contact with the lower end of the receptacle 1 and sleeve 3, as indicated by the arrow in FIG. 12.

Figure 13:
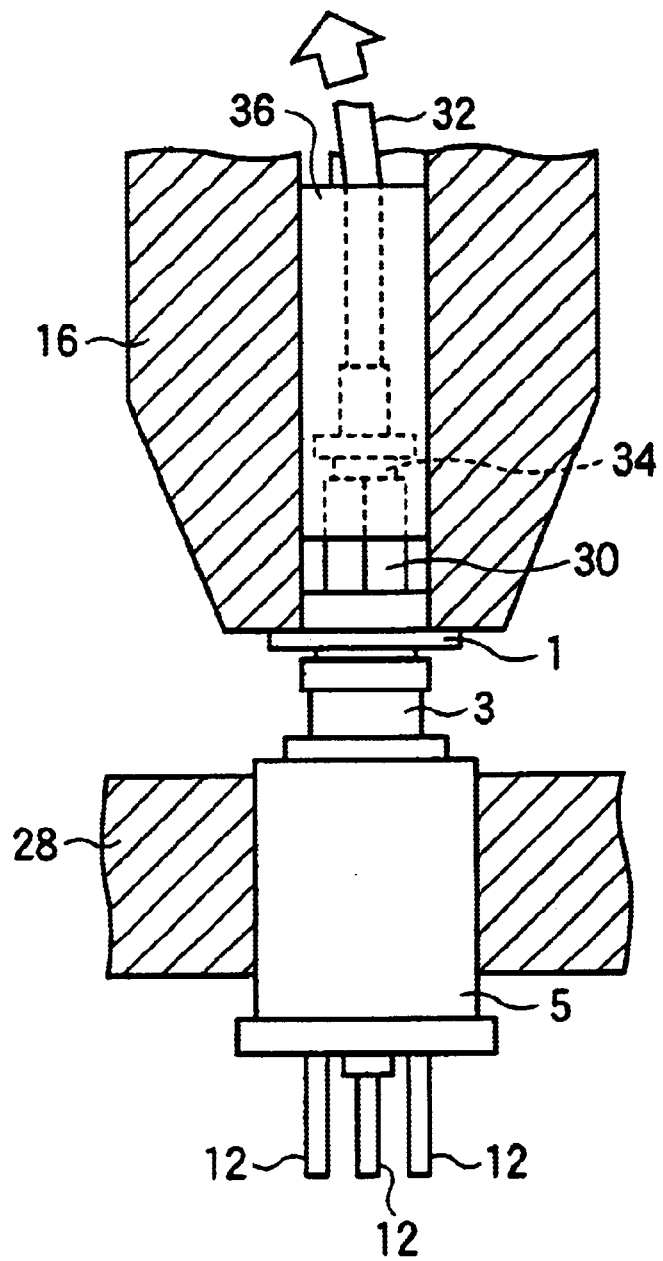
FIG. 13 is a partially cutaway side view showing the laser diode unit in FIG. 12 being optically aligned with the receptacle.

Referring to FIG. 13, a split sleeve 30 of the type generally used for making optical connections is inserted as far as possible into the receptacle 1, between the flange and ferrule of the receptacle 1. An optical cable 32 with a connector at one end is then plugged into the receptacle 1, by inserting the ferrule 34 of the cable connector into the split sleeve 30 so that this ferrule 34 meets the ferrule of the receptacle 1. The connector end of the cable 32 and the split sleeve 30 are partly encased in a jacket 36.

Power is supplied to the laser diode unit 5 through the terminals 12, causing a beam of light to be emitted by the laser diode 14 toward the optical fiber 10 in the receptacle 1. The light entering the optical fiber 10 is coupled from the optical fiber 10 into the cable 32. The other end of cable 32 is connected to an optical power meter (not shown). The optical output from the cable 32 is monitored as the laser diode unit 5 is positioned in relation to the receptacle 1 and sleeve 3, by moving one or both of the two fixtures 16, 28.

Figure 14:
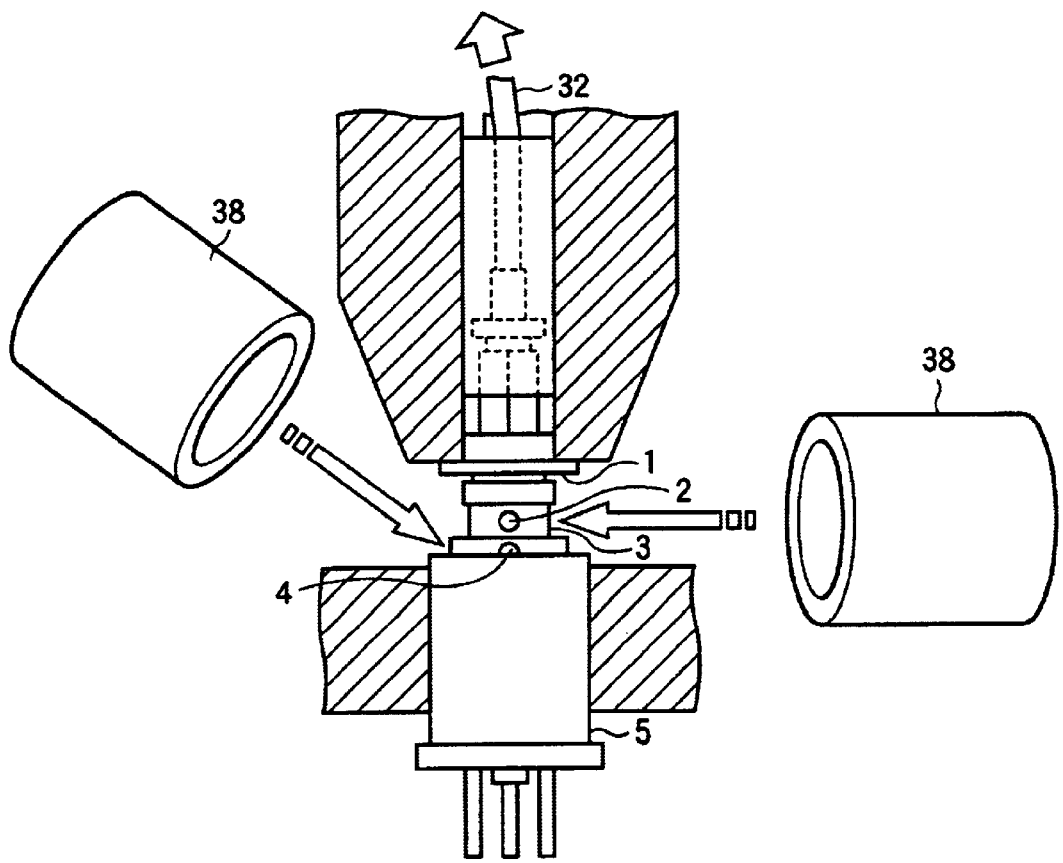
FIG. 14 is a partially cutaway side view showing the receptacle, sleeve, and laser diode unit in FIG. 13 being welded together.

When the optical output from the cable 32 reaches the desired value, the optical fiber 10 in the receptacle 1 is considered to be accurately aligned on the optical axis of the laser diode 14 in the laser diode unit 5, and the positioning motion is stopped. Yttrium-aluminum-garnet (YAG) lasers 38 are now used to weld the sleeve 3 to the receptacle 1 as shown in FIG. 14. Three spot welds 2 are made simultaneously, equally spaced around the circumference of the sleeve 3 (only one weld 2 is visible in the drawing). For these welds, the YAG lasers 38 are oriented so that their output beams are horizontal, as shown on the right in FIG. 14. Next, the YAG lasers 38 are tilted as shown on the left in FIG. 14 to make three spot welds 4 that join the sleeve 3 to the laser diode unit 5. These three spot welds 4 (of which only one is visible in the drawing) are also spaced equally around the circumference of the sleeve 3, mutually separated by angles of one hundred twenty degrees (120°), and are made simultaneously.

Figure 15:
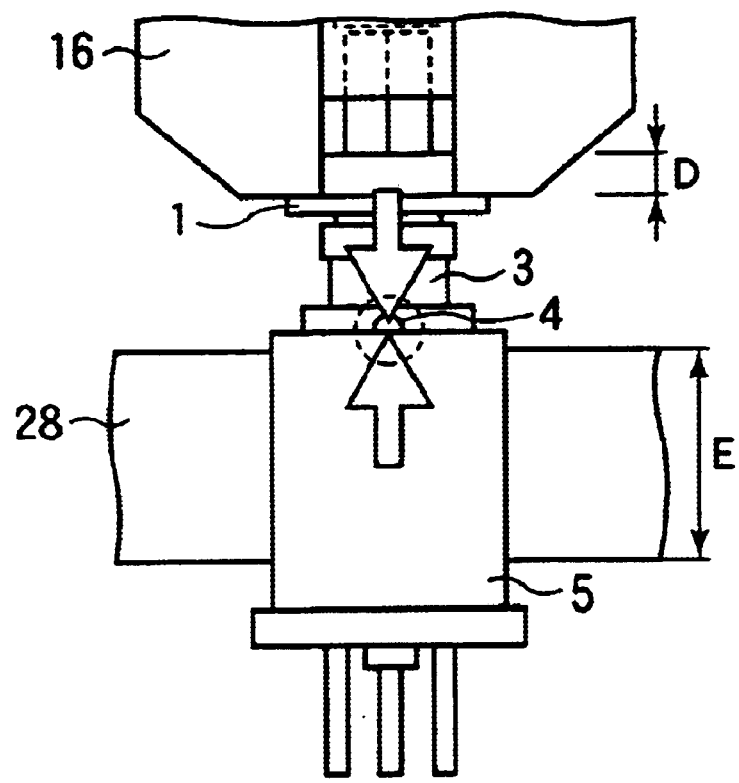
FIG. 15 is a partially cutaway side view illustrating tension caused by the welding process, causing the receptacle to move.

As noted above, when the welding process is completed, the optical output from the cable 32 is sometimes found to have decreased by two decibels or more. The reason for this decrease is thought to be a tension force, indicated by the arrows in FIG. 15, that is created by the spot welds 4 that attach the sleeve 3 to the laser diode unit 5. When the metal in these welds 4 cools and hardens after being melted by the YAG lasers, the metal contracts, attempting to pull the sleeve 3 and receptacle 1 downward and the laser diode unit 5 upward. Since the grip of fixture 16 on the receptacle 1 extends over only a comparatively short distance D, while the grip of fixture 28 on the laser diode unit 5 extends over a longer distance E, the tension at the three spot welds 4 draws the receptacle 1 and sleeve 3 slightly downward while the laser diode unit 5 remains immobilized.

If the amount of downward movement caused by the three spot welds 4 is not uniform, the result of the movement is that the receptacle 1 tilts slightly. This tilt disturbs the alignment of the optical fiber 10 in the receptacle 1 with the optical axis of the laser diode 14 in the laser diode unit 5, so that less light is coupled into the optical fiber. In addition, the coupling between the optical fiber 10 in the receptacle 1 and the cable 32 plugged into the receptacle 1 becomes less reliable.

Figure 16:
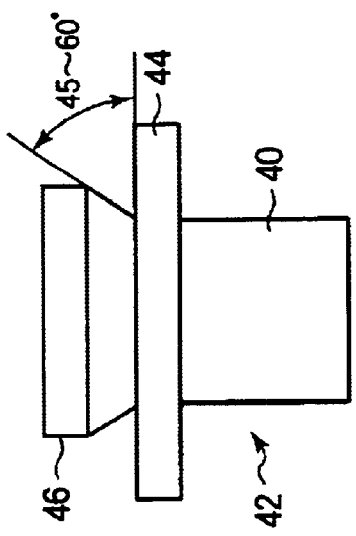
FIG. 16 is a side view of a receptacle illustrating a first embodiment of the present invention.

Referring now to FIG. 16, in a first embodiment of the present invention, the upper end of the flange 40 of the receptacle 42 of the coaxial laser diode module has a reverse taper just above the projecting ring 44. The outer wall of the uppermost part 46 of the flange 40 is straight, but at a point approximately halfway down toward the projecting ring 44, the outer wall tapers inward, so that it meets the projecting ring 44 at an angle of about forty-five to sixty degrees (45°–60°) instead of at a right angle.

Figure 17:
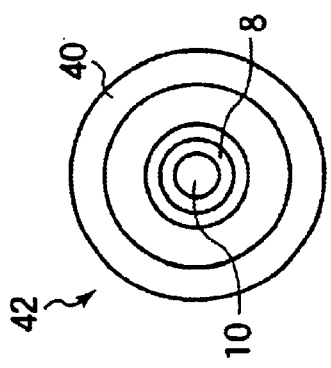
FIG. 17 is an end view of the receptacle in FIG. 16.

Referring to FIG. 17, the receptacle 42 in the first embodiment also includes a conventional ferrule 8 and optical fiber 10.

Figure 19:
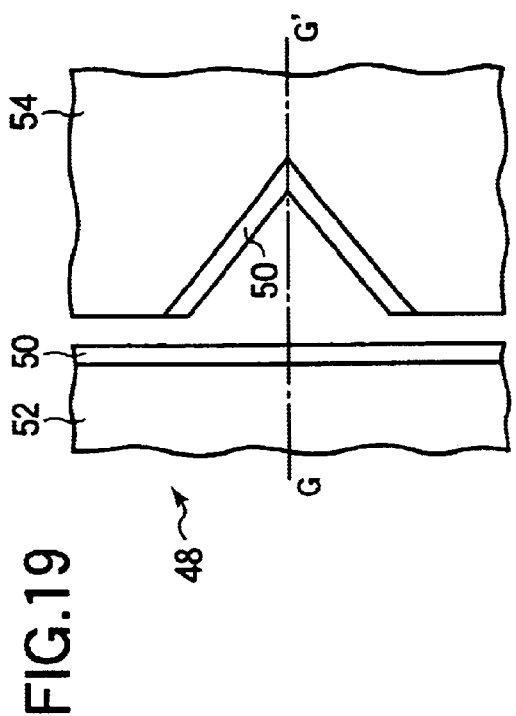
FIG. 19 is a top view of the fixture in FIG. 18.
Figure 18:
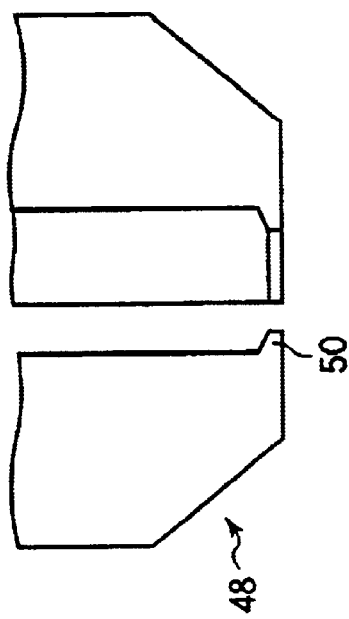
FIG. 18 is a partially cutaway side view of a fixture used in the first embodiment.

Referring to FIG. 18, the two-part fixture 48 for holding the receptacle 42 in the first embodiment is generally similar to the conventional fixture, but has a projecting lip 50 at its lower end. The projecting lip 50 has a trapezoidal sectional shape. Referring to FIG. 19, both the flat part 52 and the V-shaped part 54 of the fixture 48 have projecting trapezoidal lips 50. Incidentally, the view in FIG. 18 is a cutaway view along line G–G' in FIG. 19.

Figure 20:
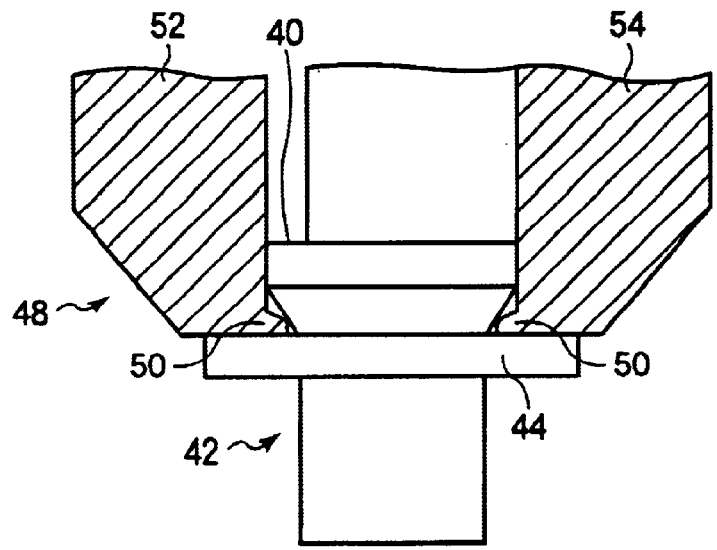
FIG. 20 is a partially cutaway side view of the receptacle in FIG. 16 being held by the fixture in FIG. 18.
Figure 21:
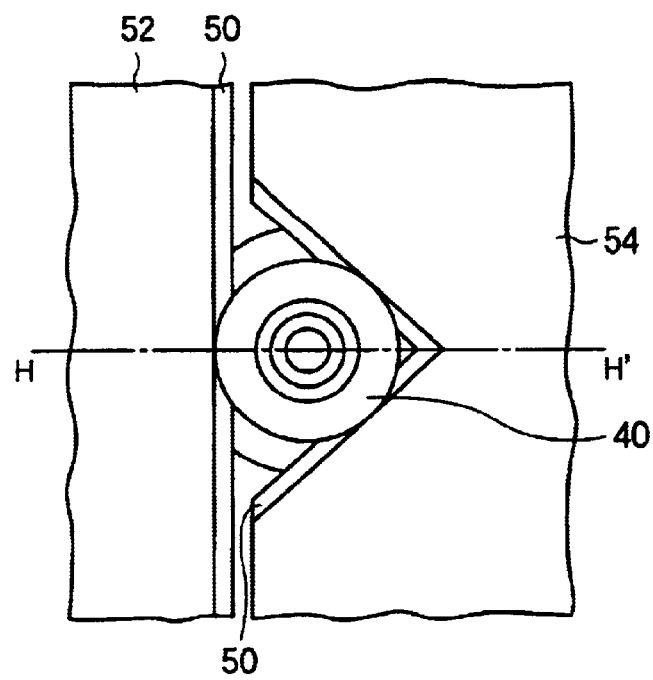
FIG. 21 is a top view of the receptacle in FIG. 16 being held by the fixture in FIG. 18.

Referring to FIG. 20, when the receptacle 42 is held in the fixture 48, the projecting trapezoidal lip 50 fits into the tapered indentation in the flange 40, just above the projecting ring 44. The bottom surface of the projecting trapezoidal lip 50 sits on the projecting ring 44, while the upper corner of the projecting trapezoidal lip 50 is pressed against the tapered wall of the flange 40. Both parts 52, 54 of the fixture 48 hold the receptacle 42 in this way. The projecting trapezoidal lip 50 supports the flange 40 at three points, as can be seen in FIG. 21. Incidentally, the view in FIG. 20 is a partially cutaway view along line H–H' in FIG. 21.

The coaxial laser diode module of the first embodiment also includes a sleeve 3 and a laser diode unit 5 of the conventional type. The coaxial laser diode module is assembled in the conventional way, as illustrated in FIGS. 9 to 14, but when the three spot welds 4 illustrated in FIG. 14 are made to attach the sleeve 3 to the laser diode unit 5, the projecting trapezoidal lip 50, by pressing against the tapered wall of the flange 40 as shown in FIG. 20, prevents the receptacle 42 from being drawn even slightly downward. Correct alignment of the optical fiber 10 in the receptacle 42 with the optical axis of the laser diode 14 in the laser diode unit 5 is therefore maintained.

When coaxial laser diode modules are assembled using the receptacle 42 and fixture 48 of the first embodiment, the rate of optical alignment defects attributable to the spot welding step approaches zero. As a result, the yield of the manufacturing process is improved, and the manufacturing cost per module is reduced.

Figure 22:
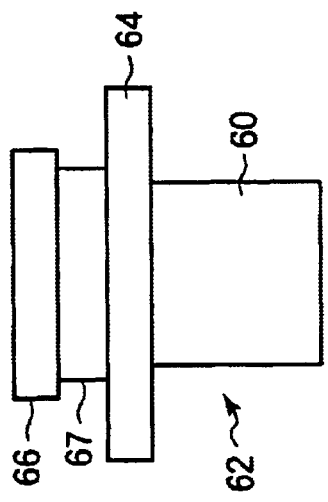
FIG. 22 is a side view of a receptacle illustrating a second embodiment of the present invention.

Referring to FIG. 22, in a second embodiment of the present invention, the upper end of the flange 60 of the receptacle 62 is indented in a rectangular fashion above the projecting ring 64. The portion of the flange 60 above the projecting ring 64 comprises two parts 66, 67 of approximately equal vertical height, both with straight walls, but the upper part 66 has a larger outer diameter than the lower part 67. The wall of the lower part 67 meets both the upper part 66 and the projecting ring 64 at right angles.

Figure 23:
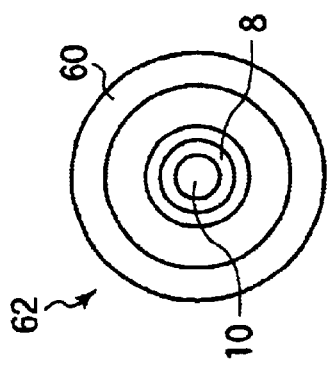
FIG. 23 is an end view of the receptacle in FIG. 22.

The receptacle 62 in the second embodiment also includes a conventional ferrule 8 and optical fiber 10, as shown in FIG. 23.

Figure 25:
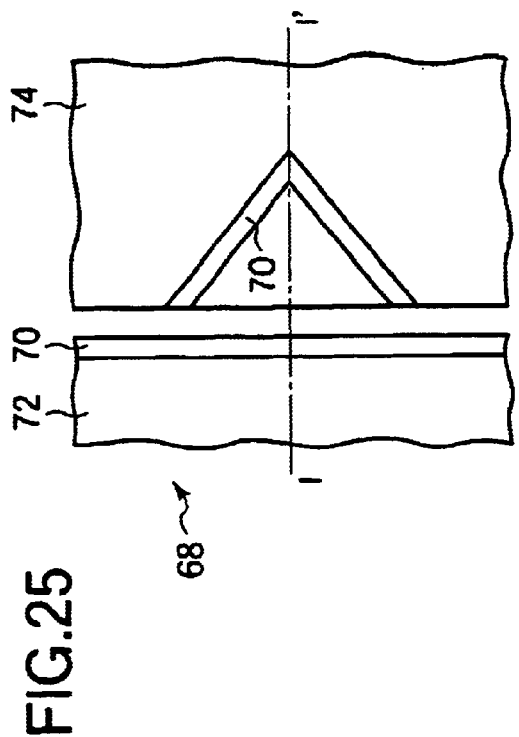
FIG. 25 is a top view of the fixture in FIG. 24.
Figure 24:
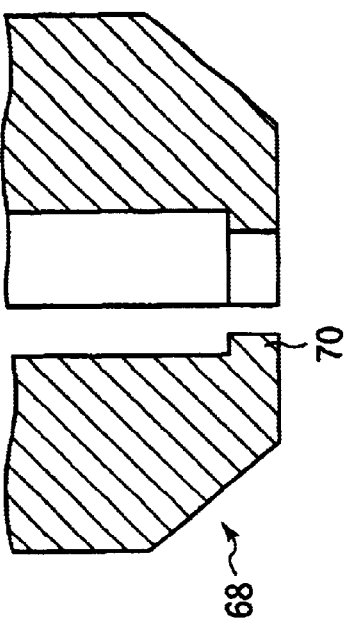
FIG. 24 is a partially cutaway side view of a fixture used in the second embodiment.

Referring to FIG. 24, the two-part fixture 68 for holding the receptacle 62 in the second embodiment is generally similar to the conventional fixture, but has a projecting lip 70 at its lower end. The projecting lip 70 has a rectangular sectional shape. Referring to FIG. 25, both the flat part 72 and the V-shaped part 74 of the fixture 68 have projecting rectangular lips 70. The view in FIG. 24 is a cutaway view along line I–I' in FIG. 25.

Figure 26:
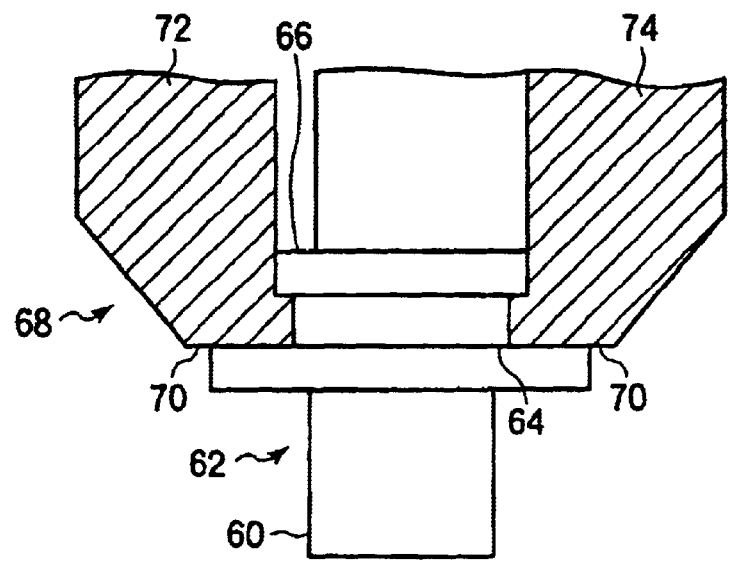
FIG. 26 is a partially cutaway side view of the receptacle in FIG. 22 being held by the fixture in FIG. 24.
Figure 27:
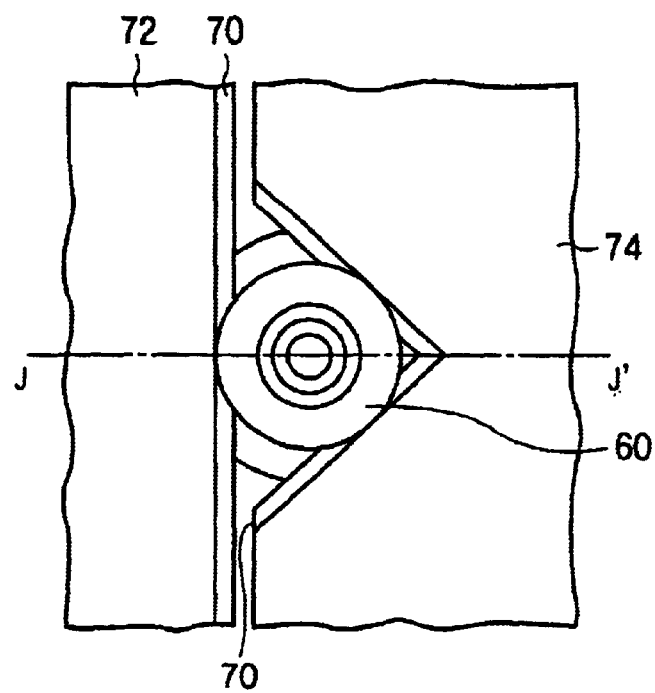
FIG. 27 is a top view of the receptacle in FIG. 22 being held by the fixture in FIG. 24.

Referring to FIG. 26, when the receptacle 62 is held in the fixture 68, the projecting rectangular lip 70 fits snugly into the rectangular indentation in the flange 60. The lower surface of the projecting rectangular lip 70 sits on the projecting ring 64, the upper surface of the lip 70 fits against the underside of the uppermost part 66 of the flange 60, and the front edge of the lip 70 presses inward on the flange 60. Both parts 72, 74 of the fixture 68 hold the receptacle 62 in this way, supporting the flange 60 at three points, as can be seen in FIG. 27. The view in FIG. 26 is a partially cutaway view along line J–J' in FIG. 27.

The coaxial laser diode module of the second embodiment also includes a conventional sleeve 3 and laser diode unit 5, and is assembled in the conventional way, as illustrated in FIGS. 9 to 14. When the three spot welds 4 illustrated in FIG. 14 are made to attach the sleeve 3 to the laser diode unit 5, the projecting rectangular lip 70 prevents the receptacle 62 from being drawn downward, so correct optical alignment is maintained, as in the first embodiment.

Coaxial laser diode modules manufactured using the receptacle 62 and fixture 68 of the second embodiment show the same low rate of alignment defects attributable to welding as in the first embodiment, with similar benefits of increased yield and reduced cost per module.

The invention is not limited to the two embodiments described above. The shape of the projecting lip need not be trapezoidal or rectangular, although these two shapes have the advantage of being easy to fabricate. The shape of the indentation in the flange can also be varied, and the shapes and relative sizes of other parts of the module and fixtures may differ from those shown in the drawings.

It should be noted that the term 'flange' is sometimes used to denote what were referred to above as the projecting rings 24, 44, 64.

Those skilled in the art will recognize that further modifications to the embodiments are possible within the scope of the invention as claimed below.

What is claimed is:

1. A method of manufacturing an opto-electronic module having an opto-electronic unit for generating a light beam and a receptacle for attachment of an optical fiber cable into which the light beam is optically coupled, comprising forming an indentation in the receptacle;

holding the receptacle in a first fixture having a projecting lip fitting into the indentation;

holding the opto-electronic unit in a second fixture;

optically aligning the opto-electronic unit with the receptacle; and fastening the receptacle to the opto-electronic unit by welding, the projecting lip of the first fixture preventing the receptacle from moving toward the opto-electronic unit during said welding.

2. The method of claim 1, wherein the projecting lip of the first fixture is trapezoidal.

3. The method of claim 1, wherein the projecting lip of the first fixture is rectangular.

4. The method of claim 1, wherein the indentation in the receptacle has a reverse taper shape.

5. The method of claim 1, wherein the indentation in the receptacle has a rectangular shape.

6. The method of claim 1, wherein the fastening of the receptacle to the opto-electronic unit is carried out by:

welding the receptacle to a sleeve; and welding the sleeve to the opto-electronic unit.

7. The method of claim 1, wherein the fastening of the receptacle to the opto-electronic unit is carried out by laser spot welding.

8. The method of claim 1, wherein the opto-electronic module is a coaxial laser diode module.

* * * * *